(12) United States Patent
Röhrig (10) Patent No.: US 7,866,495 B2
(45) Date of Patent: Jan. 11, 2011

(54) BABY BOTTLE, AND METHOD OF PRODUCTION OF A BABY BOTTLE

(75) Inventor: Peter Röhrig, Vienna (AT)

(73) Assignee: Bamed AG, Wollerau (CH)

( * ) Notice: Subject to any disclaimer, the term of this patent is extended or adjusted under 35 U.S.C. 154(b) by 1188 days.

(21) Appl. No.: 10/576,621

(22) PCT Filed: Oct. 22, 2004

(86) PCT No.: PCT/AT2004/000366

§ 371 (c)(1), (2), (4) Date: Jul. 13, 2006

(87) PCT Pub. No.: WO2005/041851

PCT Pub. Date: May 12, 2005

(65) Prior Publication Data

US 2007/0068890 A1 Mar. 29, 2007

(30) Foreign Application Priority Data

Oct. 23, 2003 (AT) .............................. A 1689/2003

(51) Int. Cl.
*A61J 9/04* (2006.01)
*A61J 11/00* (2006.01)

(52) U.S. Cl. .................... 215/11.5; 215/11.1; 215/902; 220/714; 220/745; 220/DIG. 27

(58) Field of Classification Search ................ 215/11.1, 215/11.4, 11.5, 307, 378, 902; 220/745, 220/DIG. 27; 137/526
See application file for complete search history.

(56) References Cited

U.S. PATENT DOCUMENTS 3,028,983 A * 4/1962 Barr ........................... 215/365
3,113,569 A * 12/1963 Barr et al. ................... 215/11.1
3,393,817 A * 7/1968 Meierhoefer ............... 215/11.5
4,545,491 A * 10/1985 Bisgaard et al. ............ 215/11.5
4,613,050 A 9/1986 Atkin et al.
D330,938 S * 11/1992 Sakashita ................... D24/196
5,499,729 A 3/1996 Greenwood et al.
5,699,921 A * 12/1997 Rodriguez ................. 215/11.5
6,042,850 A * 3/2000 Ida et al. ........................ 426/2
6,053,342 A 4/2000 Chomik
6,142,325 A 11/2000 Chomik (Continued)

FOREIGN PATENT DOCUMENTS

CN 1326413 12/2001

(Continued)

*Primary Examiner*—Sue A Weaver
(74) *Attorney, Agent, or Firm*—Ladas & Parry LLP (57) ABSTRACT

A bottle, in particular a baby's bottle, having a bottle jacket that is open at both ends. A base cap that is equipped with an air intake valve is fixed in one base end region of the bottle jacket and a teat is fixed in the opposite teat end region. The teat has a shaft and a nipple connected to the shaft by a lip contact region. The bottle jacket has an essentially conical form that widens from the teat end region to the base end region and the wall thickness of the shaft of the teat is greater than the wall thickness of the teat in the lip contact region and of the nipple. The bottle jacket is injection-molded from a polyolefin, in particular polypropylene.

26 Claims, 4 Drawing Sheets

U.S. PATENT DOCUMENTS

| | | | |
|---|---|---|---|
| 6,209,736 B1 * | 4/2001 | Chen et al. | 215/11.5 |
| 6,365,202 B1 * | 4/2002 | Ida et al. | 426/2 |
| 6,645,228 B2 * | 11/2003 | Renz | 606/236 |
| 2002/0108925 A1 | 8/2002 | Mihashi | |
| 2003/0024895 A1 * | 2/2003 | Meyers et al. | 215/11.5 |
| 2003/0093121 A1 * | 5/2003 | Randolph | 606/236 |
| 2004/0118801 A1 * | 6/2004 | Brown et al. | 215/11.1 |
| 2004/0220323 A1 * | 11/2004 | Gu | 524/515 |

FOREIGN PATENT DOCUMENTS

| | | | |
|---|---|---|---|
| DE | 87 04 733 | | 9/1987 |
| DE | 202 09 899 | | 9/2002 |
| EP | 1 310 230 | | 5/2003 |
| FR | 647873 | | 12/1928 |
| FR | 2 640 875 | | 6/1990 |
| GB | 2238729 A | * | 6/1991 |
| JP | 49-74392 | | 6/1974 |
| JP | 2002-527312 A | | 8/2002 |
| JP | 2003-205018 A | | 7/2003 |
| WO | WO 90/07320 | * | 7/1990 |

\* cited by examiner

BABY BOTTLE, AND METHOD OF PRODUCTION OF A BABY BOTTLE

FIELD OF THE INVENTION

The invention relates to a bottle, in particular to a baby bottle, comprising a bottle jacket open on both sides, wherein a base cap including an air intake valve is fastened to a bottom-side end region of the bottle jacket, and a teat is fastened to the opposite, teat-side end region, which teat comprises a shaft and a nipple following said shaft via a lip contacting region, as well as to a method of producing a bottle jacket open on both sides thereof for a bottle.

BACKGROUND OF THE INVENTION

Such a baby bottle comprising a bottle jacket open on both sides thereof is already known from U.S. Pat. No. 5,499,729 A. There, a baby bottle consisting of a cylindrical jacket is disclosed, wherein a sleeve cap is screwed to the open end thereof for fastening a teat. In the oppositely arranged bottom region, a further cap is provided for clamping engagement of a diaphragm as an elastomeric valve element. The diaphragm has a plurality of apertures which, in the relaxed state of the diaphragm, are in their closed positions. When applying a negative pressure in the container interior, the apertures are cleared for the passage of air. There, the bottom region of the baby bottle is relatively small, so that also the valve element arranged in the bottom region has only a comparatively small area. The cylindrical jacket consists of a polycarbonate material common with baby bottles which is blow-molded.

Furthermore, a bottle jacket, in particular for baby bottles, having two open ends is known from U.S. Pat. No. 6,142,325 A, wherein a bottom cap having a valve element is screwed to a bottom-side end portion. However, also here a comparatively small bottom area and, thus, only a relatively small valve element is provided so that an entry of air into the interior of the baby bottle is possible only in case of relatively large pressure differences. The bottle jacket may be made of glass, polyester, polyamides, polyolefins, polycarbonates and the like.

From U.S. Pat. No. 6,053,342 A, a baby bottle is known in which a cylindrical, angled bottle jacket open on both sides thereof is provided. Here, too, a teat is fastened to an end region by means of a sleeve cap, and in the relatively small opposite bottom region a cap with an elastic diaphragm having air passage openings is provided, the diaphragm being connected to the cap via at least one tab. The bottle jacket which is open on both sides is produced from polycarbonate by a blow molding method.

From FR 647 873 A, still another baby bottle is known which includes a special drinking spout molded in one piece with the bottle jacket. This special bottle jacket which may have a conical shape is open on its bottom side, a fastening ring which carries a bottom surface being screwed to the open end portion. In order to prevent corrosion, this bottom surface preferably is made of aluminum.

From U.S. Pat. No. 4,613,050 A, yet another baby bottle having a conventional cup-shaped bottle jacket is known, a special air valve being provided in the region of the screw cap so as to enable an intake of air into the baby bottle.

So far, food intake by babies from such baby bottles has been markedly different from drinking at a mother's breast. At the mother's breast, the extremely soft nipple is almost exclusively stripped by the baby's tongue and palate, and since this does not cause any negative pressure (vacuum) in the mother's breast, completely steady drinking is possible. In particular, no or only slight sucking (vacuum) is used by the baby him/herself in order to get the milk into his/her mouth and then swallow the former. Drinking practically corresponds to drinking from a cup, accompanied by additional stripping.

In the known baby bottles, however, a negative pressure forms in the bottle already with the first drinking, which the baby counteracts by producing a stronger vacuum (sucking). This type of sucking will then have the effect that also air is sucked in and swallowed from the mouth cavity. This air will then give rise to the highly uncomfortable colics which are extremely stressful for mother and child and from which many babies suffer seriously. Moreover, the sucking portion must be comparatively stiff and hard so that it will not collapse, as a consequence of the negative pressure prevailing in the bottle, and thereby render drinking impossible. Yet, such a stiff sucking part practically does not allow any stripping, whereby the child gets at the milk—and also at the undesired air—practically only by sucking (vacuum).

SUMMARY OF THE INVENTION

It is now an object of the present invention to provide a bottle of the initially defined type, by which food intake from a natural mother's breast is simulated as closely as possible.

With the bottle of the initially defined type, this is achieved in that the bottle jacket has a substantially conical shape widening from a teat-side end region to its bottom-side end region and the wall thickness of the shaft of the teat is greater than the wall thickness of the teat in the lip contacting region and of the nipple.

Due to the substantially conical shape of the bottle jacket which widens towards its bottom-side end region, there results a comparatively large, bottom-side valve through which a pressure equalization becomes possible already in case of slight pressure differences. Since the teat additionally has a wall thickness in its shaft region which is higher than the wall thickness of the teat in the lip contacting region and of the nipple, sucking of the child at the natural breast of the mother can be particularly closely simulated. Designing the teat with different wall thicknesses results in a comparatively solid base by the shaft of higher wall thickness which resiliently carries the residual teat, i.e. the lip contacting region and the adjoining nipple, by which the feel of contacting the natural breast of the mother is largely imitated.

On account of the inventive large and sensitively reacting air intake valve at the bottom, practically no negative pressure will form within the bottle so that there is no longer a risk of the teat collapsing. Accordingly, the teat can be made appropriately thin in the lip contacting region and in the region of the nipple, thereby again rendering stripping possible. Thus, by making stripping movements, the baby can get milk out of the baby bottle, and need not suck. By this constructive interaction between bottom valve and teat, colics are now prevented.

Another result of the comparatively large bottom area is that the baby bottle can be cleaned easily—without a bottle brush—and, therefore, is also well suited for cleaning in a dish washer.

In order to be able to close the two open ends of the bottle jacket in a simple manner, it is suitable if the two open ends of the bottle jacket are each adjoined by an end region including a thread for receiving a cap.

With regard to a simple and reliable fastening of a teat on the end of the bottle jacket located opposite the bottom-side end region of larger diameter, it is advantageous if a teat is fastened to the end region of smaller diameter by means of a sleeve cap, a teat flange being clamped between the sleeve cap and a front face of the end region by screwing engagement of the sleeve cap with the bottle jacket.

As has already been mentioned before, it is suitable if a base cap having an air intake valve is screwed to the bottom-side end region of the bottle jacket, since by the conical design of the bottle jacket, a comparatively large valve area is provided through which in turn an air intake is rendered possible already in case of slight pressure differences—as often occurs when an infant sucks at a mother's breast.

For a reliable air intake via the air intake valve of the base cap it is advantageous if a diaphragm is received in the base cap for forming the air intake valve, a fastening flange of the diaphragm being clamped between the front face of the bottom-side end region and the base cap for reliably fixing the diaphragm.

Even though an air intake into the bottle interior is already possible via the threaded connection between the bottle jacket and the base cap, for facilitating such an air intake it may be advantageous if at least one air intake opening is provided in the base cap.

With regard to good sealing against an air intake in the closed position of the diaphragm via the threaded connection between the cap and the bottle jacket, it is advantageous if the diaphragm has a shape corresponding to the cup-shaped design of the base cap.

To design the diaphragm in the manner of a flap valve, it is advantageous if the diaphragm is circular-ring-shaped.

In order to ensure a pressure equalization even in case of the slightest pressure differences and thus, prevent a vacuum from forming in the bottle interior, it is suitable if the diaphragm has an inner diameter of at least 15 mm, preferably of substantially 30 mm.

For good sealing by means of the diaphragm in its closed position, particularly if the latter is circular-ring-shaped, it is suitable if the base cap is designed calotte-shaped with a central elevated portion.

If the inner end portion of the circular-ring-shaped diaphragm abuts on the central elevated portion of the base cap, an annular sealing face of the diaphragm will result on the central elevated portion in the closed position of the diaphragm, which can be cleared by the diaphragm turning open in case a negative pressure occurs in the bottle.

To reliably prevent an unintentional escape of liquid from the bottle as well as to maintain a slight residual vacuum in the bottle after sucking, it is suitable if the diaphragm is inserted into the base cap in a pre-stressed state.

Tests have shown that the natural breast of a mother is particularly closely simulated if the shaft has a wall thickness of substantially 2.00 mm to 2.50 mm, in particular of 2.25 mm, and the nipple, or the lip contacting region, respectively, has a wall thickness of substantially 1.20 mm to 1.50 mm, in particular of 1.35 mm.

Moreover, for facilitating the above-described child's stripping on the teat, it is, furthermore, advantageous if, in the lip contacting region, at least one zone is provided whose wall thickness is thinner than the wall thickness of the remaining lip contacting region. Here, again, tests have shown that for said "stripping" on the part of the baby it is particularly advantageous if the zone has a wall thickness of substantially 1.30 to 1.60 mm, in particular of 1.45 mm.

If the zone of reduced wall thickness extends as far as into the nipple, the zone of reduced wall thickness is provided in the entire contacting region of the child's mouth or tongue, whereby "stripping" on the part of the baby is further facilitated. Here, it is suitable that the zone is substantially triangular in elevational view.

In order to prevent an undesired pressing together or collapsing of the teat in the region of the zones of reduced wall thickness, it is suitable if the zone of reduced wall thickness is reinforced by at least one stiffening rib.

To avoid undesired raised portions on the outer side of the teat, it is preferred if the stiffening rib in the region of the zone of reduced wall thickness is provided on the inner side of the teat.

Particularly in connection with the preferred extension of the zone of reduced wall thickness as far as into the nipple, it is suitable if the stiffening rib extends as far as into the nipple.

Preferably, the nipple has a substantially oval cross-section, whereas the shaft has a circular cross-section. By this, the child can comfortably take the teat into his/her mouth in two defined positions only, and this has the consequence that the zones of reduced wall thickness can be provided at precisely defined locations on the teat. Accordingly, it is furthermore suitable if two diametrically opposite zones of reduced wall thickness are provided. In this context it is, moreover, suitable if the two zones of reduced wall thickness are located in the region of the flatter sides of the nipple.

In order to provide a particularly good imitation of the mother's breast also in terms of its surface texture, it is advantageous if the teat surface in the lip contacting region, or the teat surface of the nipple, respectively, in particular the zone, or zones, respectively, of reduced wall thickness, at least partially have an increased surface roughness of 100 μm at the most, in particular of 50 μm at the most. Tests have particularly shown that not only an optically soft and skin-like appearance is communicated, but that the teat, moreover, has a feel particularly similar to that of a mother's breast if a surface roughness of approximately 10 μm to approximately 40 μm, preferably of 15 μm to 30 μm, is provided.

Preferably, the teat is provided as an injection-molded part, wherein then the surface-rough zones of the teat are produced by correspondingly rough regions in the injection mold. These rough regions may, e.g., be produced by spark erosion or by chemical etching of the mold surfaces of the injection mold.

It should, furthermore, be mentioned that nowadays a substantial problem is to be seen in that, on the one hand, for health reasons breast-feeding of the child and, thus, the feeding with mother's milk for the first 6 months is almost an obligation, while, on the other hand, mothers in many cases cannot breast-feed the children every 4-6 hours since they are not in the vicinity of the child. Particularly in the U.S.A., mothers usually have to appear at work already 6 weeks after they have given birth.

Mothers now try to pump their milk using breast pumps, this milk then, during their absence, being administered to the children in a bottle by someone else. Thus, children practically have to change back and forth each day between a bottle teat and their mother's breast, often resulting in great problems for many of these children who are only a few weeks of age. In most cases, the mother must ablactate and feed the child artificial food. This is absolutely undesirable from the medical point of view. American pediatricians even officially recommend breast-feeding the children until their $1^{st}$ birthday, which involved immense technical problems, as has already been mentioned above. It has been attempted to accustom the child to the same sucking performance and effort as at the mother's breast by providing as small suction openings in bottle teats as possible, yet in many cases this has been proven to be insufficient. Both the "taste" and also the stickiness of rubber or silicone teats are completely different from the feeling experienced by a child at a mother's breast.

Also the manner of sucking the milk from a bottle teat is completely different from the drinking movement at a mother's breast.

On account of the changes in the wall thickness mentioned here in detail, the design of the surface by roughness, and the special adaptation of these properties in combination with the bottom-side air intake valve indicated, a big step has been taken towards "mother's breast", and substantially longer breast-feeding periods have become possible for mothers.

Preferably, the teat is made of a thermoplastic elastomer or of silicone, latex or the like elastomeric material.

The method of the initially defined type is characterized in that the bottle jacket is injection-molded from a polyolefin, in particular polypropylene.

So far, mainly polycarbonate bottles have been employed, which, however, have the disadvantage that the material is relatively expensive and, moreover, production by means of injection stretch blow molding is relatively complex.

On the other hand, also hollow-body blow-molded bottles of polypropylene are known. What is detrimental here is that these bottles—if they were boiled after use to clean them—shrink by approximately 5% due to the so-called memory effect so that a scale applied to the jacket will be falsified. To counteract this, these hollow body blow-molded bottles must be stretched in a second production step. When producing the bottle jacket from polyolefin, in particular poplypropylene, in an injection-molding process, thus a comparatively inexpensive bottle jacket for a baby bottle can be produced which need not be subjected to an after-treatment in a further process step.

In order to simultaneously produce a relatively large bottom area in a simple manner and a large valve area, it is suitable if for designing a conical bottle jacket, the bottle jacket is produced with the help of a frusto-conical injection mold. By the frusto-conical design of the injection mold, removal of the bottle jacket from the mold will be easy since the bottle jacket can be removed from the injection mold in a simple manner in the direction to the smaller diameter.

In order to allow for an inspection of the contents of the bottle, it is advantageous if the bottle jacket is injection-molded from transparent polypropylene, in particular from so-called random-copolymer polypropylene, metallocene-catalyzed polypropylene or the like.

In the following, the invention will be explained in more detail by way of a preferred exemplary embodiment which is illustrated in the drawing, yet to which it shall not be restricted. In detail, in the drawings.

BRIEF DESCRIPTION OF THE DRAWING FIGURES

DETAILED DESCRIPTION OF THE PREFERRED EMBODIMENTS

Figure 1:
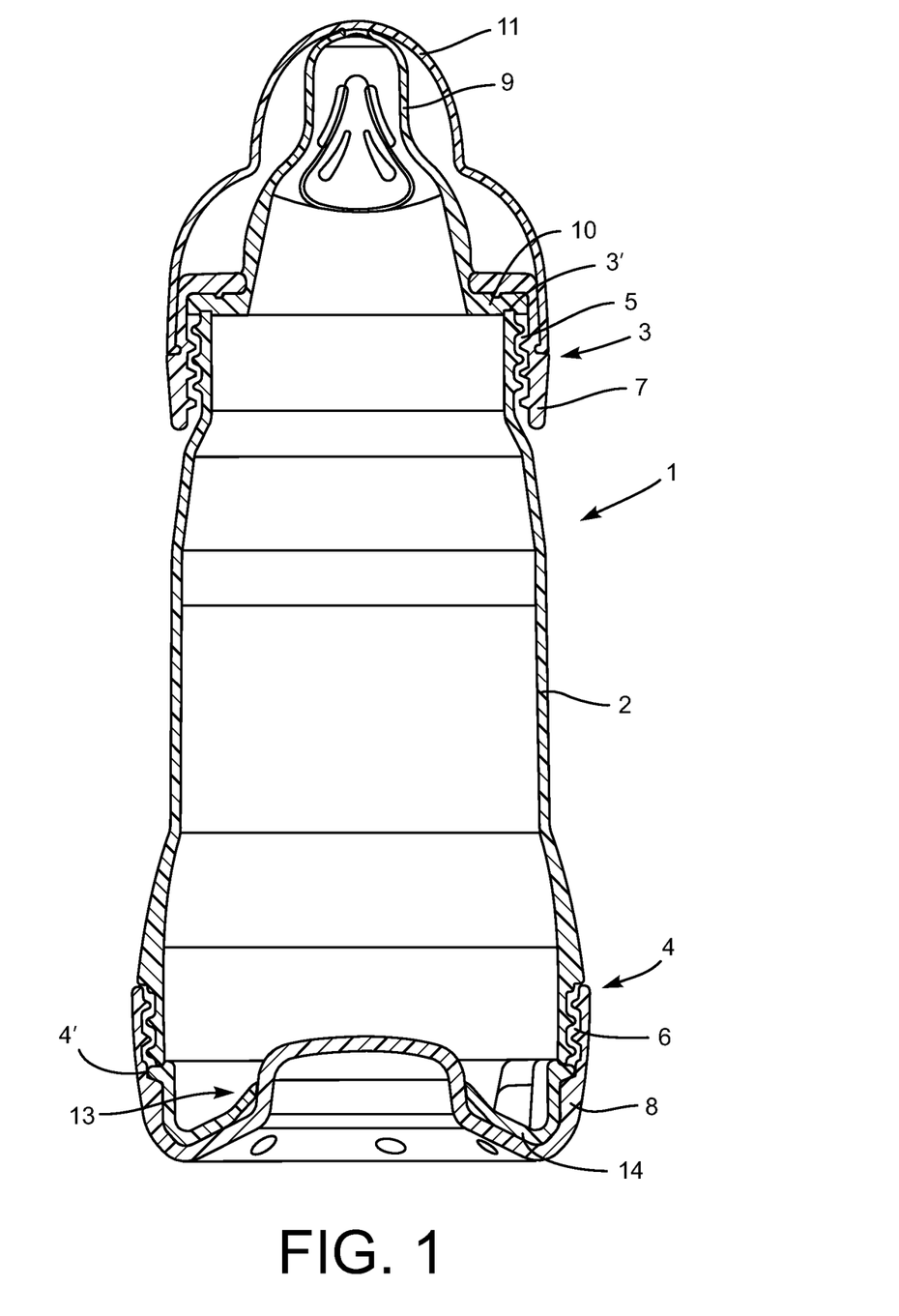
FIG. 1 shows a section through the baby bottle having a conical bottle jacket of polpropylene.

In FIG. 1, a baby bottle 1 having a conical bottle jacket 2 is shown, which jacket is open in each of its two end regions 3, 4 and which is provided with a thread 5, 6 for fastening a sleeve cap 7, and a base cap 8, respectively, thereto.

The bottle jacket 2 here is made of a polypropylene material and is injection-molded so that the conical shape of the bottle jacket 2 can easily be produced by means of a conical injection-mold. Removal of the injection-molded bottle jacket 2 of polypropylene from the mold can be effected in a simple manner by pulling down the bottle jacket 2 from the conical injection mold (not illustrated) in the direction of the smaller diameter of the injection mold.

In the upper end region 3 having the smaller diameter, a teat 9 is fastened by means of the sleeve cap 7, and for this purpose, a teat flange 10 is clamped between the sleeve cap 7 and the front side 3' of the upper end region 3. In order to prevent an escape of liquid from the bottle 1 when not in use, a protection cap 11 is put on the sleeve cap 7, which in the position illustrated in FIG. 1 covers a liquid outflow opening 12 of the teat 9 (cf. FIG. 5) by the protection cap 11 slightly pressing downwards the teat 9 when in its slipped-on position.

To the bottom-side end region 4 having the larger diameter, the base cap 8 having an air intake valve 13 is screwed via the thread 6. The air intake valve 13 is substantially composed of the base cap 8 and a diaphragm 14 inserted in the base cap 8, as is particularly visible also from FIGS. 2-4. Here, the cup-shaped base cap 8 has an inner thread 15 to be screwed to the outer thread 6 of the bottle jacket 2 and has a central elevated portion 16 which is provided as a contacting face for the diaphragm 14.

Figure 2:
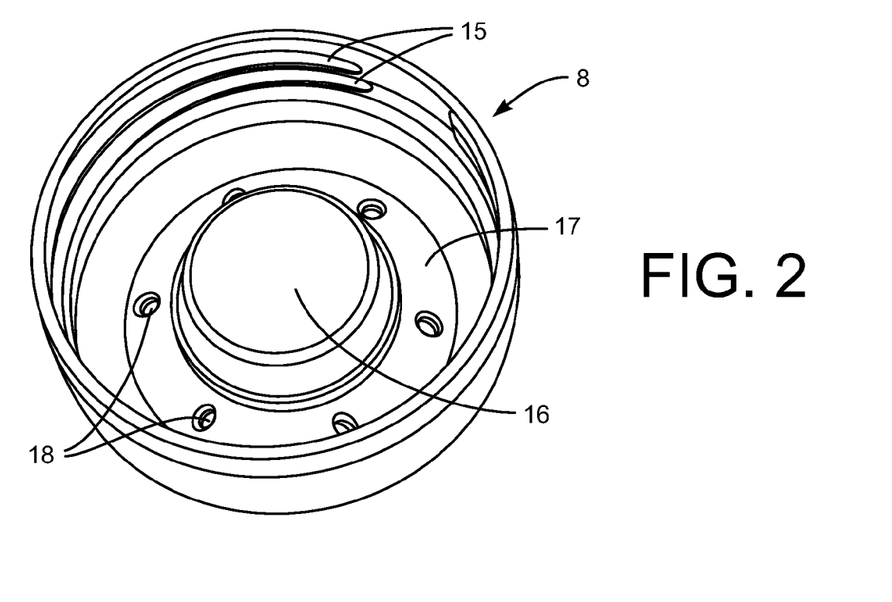
FIG. 2 shows a perspective view of the bottom cap.

As is particularly visible from FIG. 2, several air intake openings 18 are provided peripherally distributed in the circular-ring-shaped bottom surface 17 of the base cap 8, whereby a pressure equalization between the negative pressure occurring in the interior of the bottle 1 during sucking and the environment is facilitated already in case of slight pressure differences. Alternatively, however, also an embodiment without the air intake openings 18 is possible, in which an air intake is effected merely via the thread connection 6.

Figure 3:
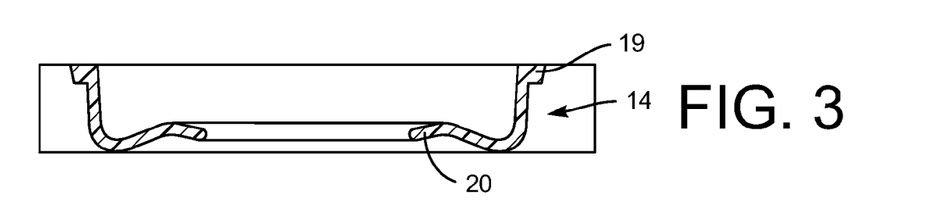
FIG. 3 shows a section through a diaphragm of a bottom-side air valve.

As is visible from FIG. 3, the diaphragm 14 has a shape substantially corresponding to the cup-shape of the base cap 8 and is provided with a fastening flange 19 which is clamped between the base cap 8 and a front face 4' of the open end region 4 so as to fasten the diaphragm 14. Moreover, the diaphragm 14 is circular-ring-shaped, a sealing lip 20 being provided in the inner end region which is angled relative to the base-cap-8-adapted course of the diaphragm 14.

Figure 4:
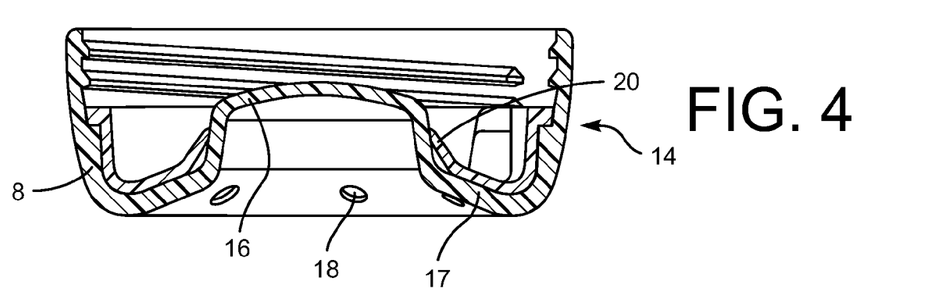
FIG. 4 shows a section through the bottom cap with the diaphragm inserted therein.

As is particularly visible from FIG. 4, the diaphragm 14 is inserted in the base cap 8 with the sealing lip 20 pre-stressed, whereby a slight vacuum will remain in the bottle 1 after sucking.

For an equalization of pressure, thus, air can enter via the air intake openings 18, or the thread connection 6, 15, respectively, and subsequently can get into the interior of the bottle 1 by the sealing lip 20 slightly being lifted off the central elevated portion 16 of the base cap 8.

Figure 5:
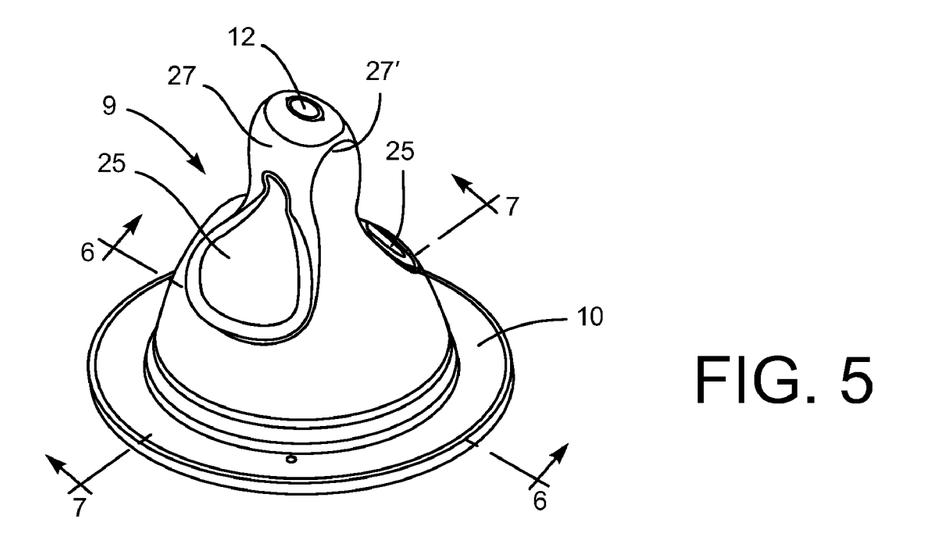
FIG. 5 shows a perspective view of a teat comprising a zone of reduced wall thickness.
Figure 6:
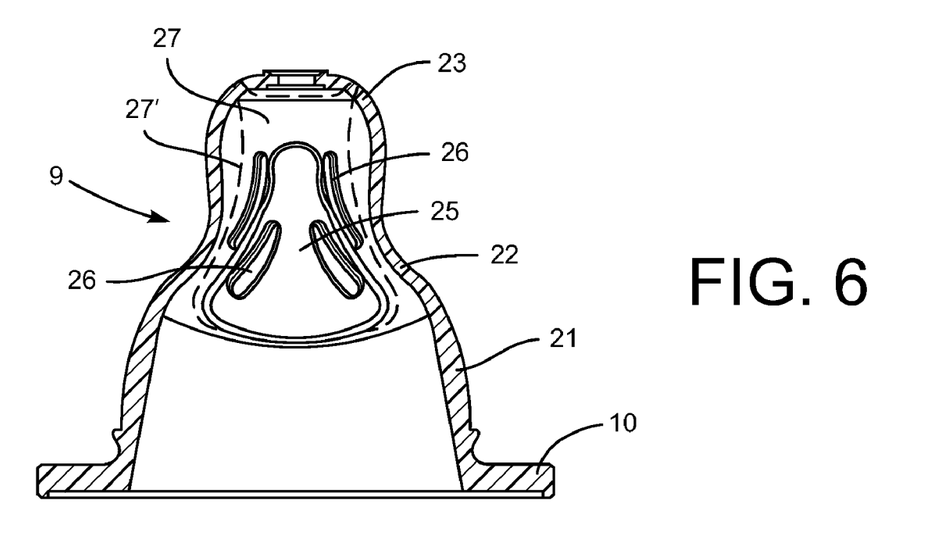
FIG. 6 shows a section according to line 6-6 of FIG. 5.
Figure 7:
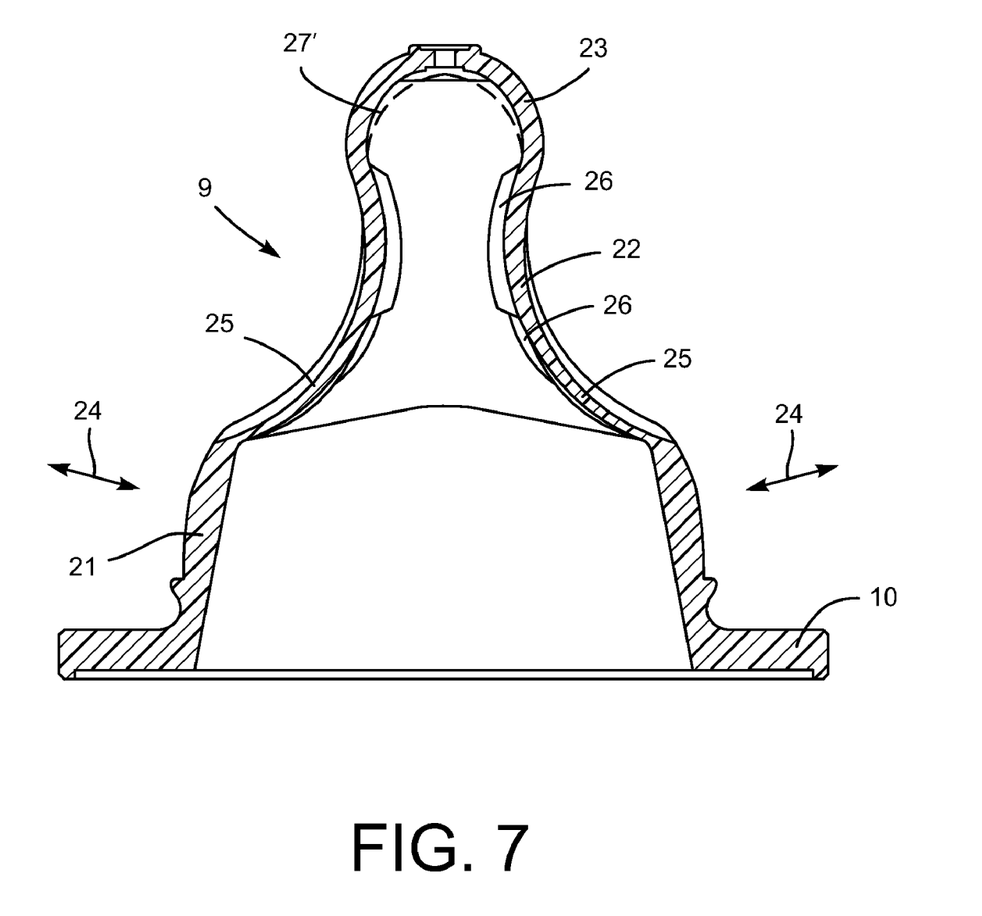
FIG. 7 shows a section according to line 7-7 of FIG. 5.

In FIGS. 5-7, the teat 9 visible in FIG. 1 is shown in detail, which, in cooperation with the bottom valve 13 which allows for a pressure equalization already at slight pressure differences, particularly allows for a sucking or stripping by the child in good imitation of sucking at a mother's breast.

For this purpose, the shaft 21 of the teat 9 has a greater wall thickness than a lip contacting region 22 following thereon, as well as a nipple 23 adjoining the former. This results in a resilience of the shaft 21 acting in the direction of arrow 24, which shaft carries the lip contacting region 22 as well as the nipple 23 of reduced wall thickness.

In order to further facilitate stripping by the child and to simulate sucking at a mother's breast, two zones 25 are provided in the lip contacting region 22, which—as is particularly visible from FIG. 7—have a further reduced wall thickness as compared to the remaining lip contacting region.

In the region of its shaft 21, the teat 9 is of rotation-symmetrical design, i.e. circular in cross-section, yet the nipple 23 is oval in cross-section so that it can comfortably be taken into the infant's mouth in two positions only, i.e. with the longer axis in transverse direction. In the lip contacting region 22, the cross-sectional shape merges from the oval shape of the nipple 23 into the circular shape of the shaft 21, whereby the shape of the nipple as largely as possible corresponds to the natural shape of a mother's nipple while a baby is sucking or stripping at the mother's nipple.

Here, the two zones 25 of reduced wall thickness are located diametrically opposite each other on the two broad sides of the teat 9, i.e. on those sides which extend in parallel to the longer axis of the oval cross-section of the nipple 23, and designed to be approximately triangular in elevational view, thereby extending with their wide base region in the lip contacting region 22 and with their narrower tip region extending as far as into the nipple 23.

On the inner side of each zone 25, four stiffening ribs 26 are provided so as to increase the strength of the teat 9, particularly in the zones 25 of reduced wall thickness, so that even when using soft materials for the teat 9, an undesired strong pressing in of the teat 9 in the lip contacting region will not occur. Thus, due to the stiffening ribs 26, collapsing of the teat, by which the continuous flow of drinking liquid, in particular milk, would be blocked, is reliably prevented.

Moreover, in the lip contacting region 22 as well as on the nipple 23, the surface of the teat 9 can have a higher surface roughness than the remaining teat 9 so that the nature of a mother's breast can be even better simulated. In the teat illustrated in FIGS. 5-7, a region 27 surrounded by the contour line 27' is provided with an increased surface roughness of approximately 100 μm at the most, in particular 50 μm at the most, and tests have shown that an optimum rough depth of between 10 μm and 40 μm, preferably of between 15 μm and 30 μm, is particularly well accepted by infants.

With the baby bottle according to the invention, for the first time an inexpensive, easy-to-produce baby bottle has been provided which has a bottom valve that allows for a pressure equalization already in case of slight pressure differences, wherein, due to the pressure equalization at slight pressure differences in combination with a teat which, on account of different wall thicknesses, simulates the mother's breast particularly well, food intake via the mother's breast can be particularly well imitated with the help of the baby bottle according to the invention.

The invention claimed is:

1. A bottle comprising:
   a bottle jacket open on both sides, wherein a base cap including an air intake valve is fastened to a bottom-side end region of the bottle jacket, and
   a teat fastened to an opposite, teat-side end region of the bottle jacket, wherein the bottle jacket is open in each of the bottom-side end region and the teat-side region, which teat comprises a shaft and a nipple following said shaft via a lip contacting region,
   wherein the bottle jacket has a substantially conical shape widening from the teat-side end region to the bottom-side end region and the wall thickness of the shaft of the teat is greater than the wall thickness of the teat in the lip contacting region and of the nipple,
   wherein the base cap comprises a central elevated portion, and a circular ring-shaped diaphragm for providing an air valve in the manner of a flap valve, and
   wherein a sealing lip is provided at an inner end region of the diaphragm, which is angled relative to a base-cap-adapted course of the diaphragm, such that in a closed position of the air valve only an inner end portion of the diaphragm abuts on the central elevated portion of the base cap in a pre-stressed state.

2. A bottle according to claim 1, wherein each end region of the bottle jacket is provided with a thread for receiving the base cap on the bottom-side end region of the bottle jacket, and for receiving a sleeve cap on the teat-side end region of the bottle jacket.

3. A bottle according to claim 2, wherein the teat is fastened by the sleeve cap to the teat-side end region, a teat flange being clamped between the sleeve cap and a front face of the teat-side end region by screwing engagement of the sleeve cap with the bottle jacket.

4. A bottle according to claim 1, wherein a fastening flange of the diaphragm is clamped between a front face of the bottom-side end region and the base cap.

5. A bottle according to claim 4, wherein the diaphragm has a shape corresponding to a cup-shaped design of the base cap.

6. A bottle according to claim 5, wherein the diaphragm has an inner diameter of at least 15 mm.

7. A bottle according to claim 1, wherein at least one air intake opening is provided in the base cap.

8. A bottle according to claim 1, wherein the base cap is designed calotte-shaped with the central elevated portion.

9. A bottle according to claim 1, wherein the shaft has a wall thickness of substantially 2.00 mm to 2.50 mm, and the lip contacting region has a wall thickness of substantially 1.20 mm to 1.50 mm.

10. A bottle according to claim 1, wherein the lip contacting region has at least one zone with a wall thickness which is thinner than the wall thickness of the remaining lip contacting region.

11. A bottle according to claim 10, wherein the at least one zone has a wall thickness of substantially 1.30 to 1.60 mm.

12. A bottle according to claim 10, wherein the at least one zone of reduced wall thickness extends as far as into the nipple.

13. A bottle according to claim 10, wherein the at least one zone is substantially triangular in elevational view.

14. A bottle according to claim 10, wherein the at least one zone of reduced wall thickness is reinforced by at least one stiffening rib.

15. A bottle according to claim 14, wherein the stiffening rib in the region of the at least one zone of reduced wall thickness is provided on the inner side of the teat.

16. A bottle according to claim 14, wherein the stiffening rib extends as far as into the nipple.

17. A bottle according to claim 10, wherein two diametrically opposite zones of reduced wall thickness are provided.

18. A bottle according to claim 17, wherein the nipple has a substantially oval cross-section including opposed flatter sides, and the two zones of reduced wall thickness are located in a region of the flatter sides of the nipple.

19. A bottle according to claim 10, wherein the at least one zone of reduced wall thickness, at least partially has an increased surface roughness of 100 μat the most.

20. A bottle according to claim 19, wherein a surface roughness of approximately 10 μm to approximately 40 μum, is provided.

21. A bottle according to claim 1, wherein the nipple has a substantially oval cross-section, whereas the shaft has a circular cross-section.

22. A bottle according to claim 1, wherein the teat is an injection-molded part.

23. A bottle according to claim 1, wherein the teat is made of a thermoplastic elastomer.

24. A bottle according to claim 1, wherein the teat is made of an elastomeric material.

25. A bottle according to claim 1, wherein the bottle jacket comprises a polyolefin.

26. A bottle according to claim 25 wherein the bottle jacket comprises a polypropylene.

* * * * *